United States Patent [19]
Hafner

[11] 3,886,921
[45] June 3, 1975

[54] ELECTRONIC CONTROL SYSTEM FOR THE VELOCITY OF A MACHINE ELEMENT

[75] Inventor: Günther Hafner, Stuttgart, Germany

[73] Assignee: Daimler-Benz Aktiengesellschaft, Germany

[22] Filed: Apr. 25, 1972

[21] Appl. No.: 247,335

[30] Foreign Application Priority Data
Apr. 26, 1971 Germany.............................. 2120459

[52] U.S. Cl................. 123/139 E; 123/102; 290/40
[51] Int. Cl........................................... F02m 39/00
[58] Field of Search........ 123/32 EA, 139 E, 119 R, 123/102; 290/40

[56] References Cited
UNITED STATES PATENTS

| | | | |
|---|---|---|---|
| 3,030,177 | 12/1971 | Engel............... | 123/32 EA |
| 3,548,792 | 12/1970 | Palmer............. | 123/32 EA |
| 3,695,242 | 10/1972 | Tada................ | 123/139 E |
| 3,699,935 | 10/1972 | Adler............... | 123/139 E |
| 3,707,950 | 1/1973 | Schlimme......... | 123/139 E |
| 3,713,427 | 1/1973 | Adler............... | 123/139 E |
| 3,750,633 | 8/1973 | Ohtani.............. | 123/140 MC |

Primary Examiner—Charles J. Myhre
Assistant Examiner—Ronald B. Cox
Attorney, Agent, or Firm—Craig & Antonelli

[57] ABSTRACT

An electronic control device for controlling the velocity of a machine element to be operated at a desired velocity, in which a pick-up forms an a.c. voltage with a frequency proportional to the velocity of the machine element; an electrical signal is obtained from this a.c. voltage which actuates a control member influencing the velocity of the machine element in the sense of a cancellation of a deviation from the desired velocity; the circuit includes a pulse former connected to the pick-up which forms rectangular pulses of equal length and equal height with a frequency proportional to the velocity; the output of the pulse former is applied to a control stage in which a d.c. voltage representing the desired velocity is compared with the electrical signal reproducing the actual velocity and a d.c. output voltage is produced proportional to the deviation from the desired value; the d.c. output voltage, in turn, is applied to an output stage by means of which the control member is controlled in accordance with the output signal of the control stage.

29 Claims, 5 Drawing Figures

PATENTED JUN 3 1975　　　　　　　　　　　　　　　3,886,921
SHEET 1
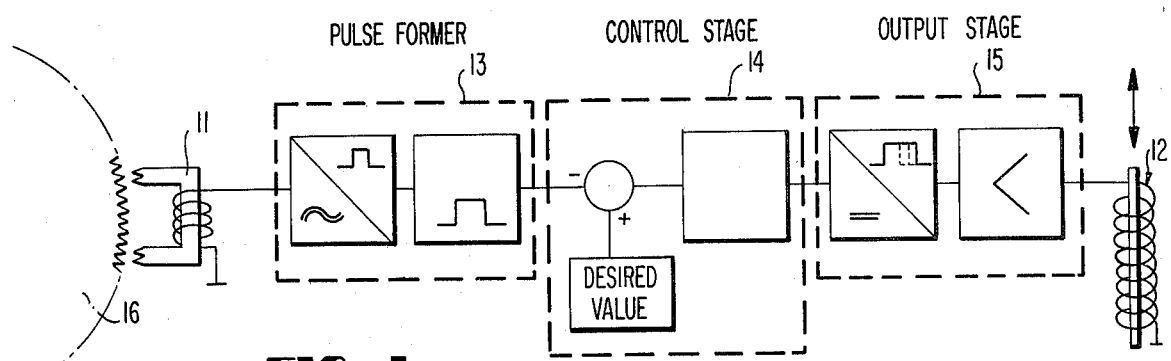
FIG. 1
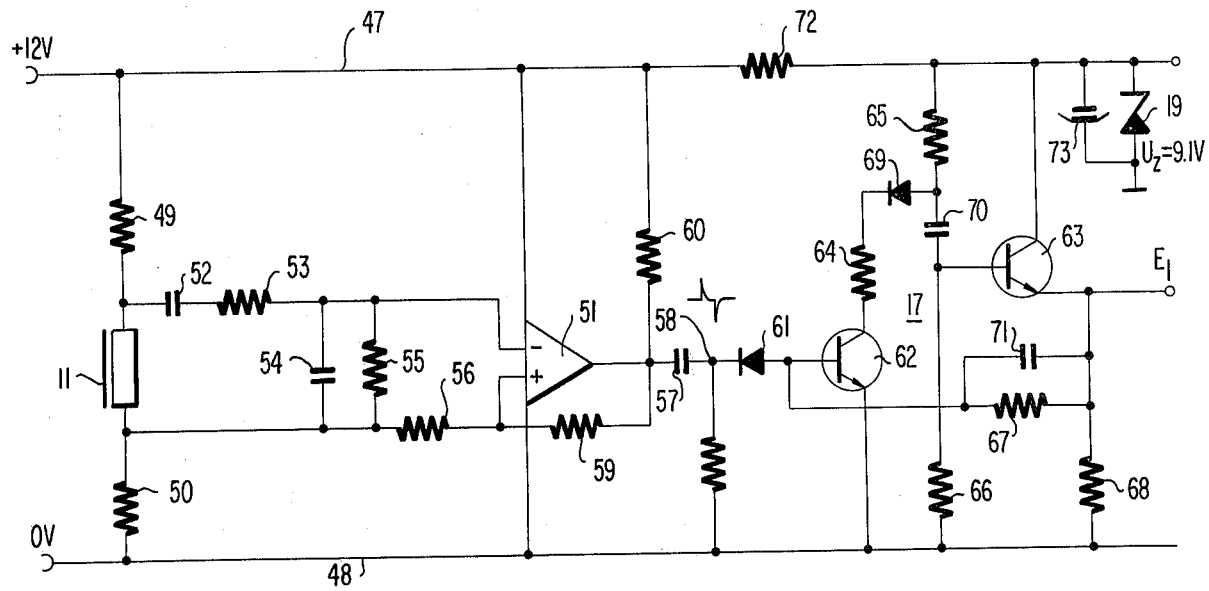
FIG. 2
FIG. 5

3,886,921

ELECTRONIC CONTROL SYSTEM FOR THE VELOCITY OF A MACHINE ELEMENT

The present invention relates to an electronic control system for the velocity of a machine element to be operated with an intended or desired speed, in which a pick-up produces an alternating-current (a.c.) voltage with a frequency proportional to the velocity of the machine element and an electric signal is obtained therefrom which actuates a control device influencing the velocity of the machine element in the sense of a cancellation of a deviation from the intended velocity.

Such types of control systems are utilized, for example, with injection pumps of Diesel engines, whereby a rotational speed signal is picked up by way of a gear wheel mounted on the cam shaft of the injection pump and after processing is supplied to an adjusting magnet that is connected by way of a bell-crank directly with the control rack of the injection pump.

The high accuracy and reliability requirements, which are made of such types of controllers, presuppose costly mechanical or hydraulic arrangements.

The aim of the present invention resides in providing an electronic control system of the aforementioned type which assures a high control accuracy with a relatively simple construction requiring no excessive expenditures and which is far-reachingly independent of interfering or disturbing influences.

As solution to the underlying problems, the present invention is characterized by a pulse former connected to the pick-up, which forms from the a.c. voltage rectangular pulses of equal length and equal height with a frequency proportional to the velocity, by a control stage in which a direct-current (d.c.) voltage representing the desired or intended velocity is compared with the electrical signal reproducing the actual velocity and a d.c. output voltage is formed proportional to the deviation from the desired value, and by an output stage, by means of which the control device is controlled corresponding to the output signal of the control stage. The high requirements made of such types of controllers are completely fulfilled by this construction with a manufacturing possibility that is favorable as regards costs.

With the application of the electronic regulating system in accordance with the present invention to a machine arrangement with gear wheels, the present invention provides that a premagnetized inductive pick-up or transmitter is utilized which responds to the passing of the teeth of a gear representing the machine element.

Advantageously, initially rectangular pulses are formed in the pulse former from the a.c. voltage supplied by the pick-up whereby of these rectangular pulses the trailing (decreasing) flank is used for triggering a monostable multivibrator which after unblocking by the trailing flank remains unblocked during an accurately defined, constant period of time and then reverts to the blocked condition so that the average value of the pulse output corresponds to the velocity of the machine element or the rotational speed of the gear. At the desired velocity or at the rated rotational speed, the pulse/pulse-gap ratio amounts preferably to 1:1. An even control stroke toward both sides is thereby assured by the rated rotational speed.

Particularly when the electronic regulating system according to the present invention is used in a motor vehicle, the operating voltage of the multivibrator is stabilized by means of a Zener diode.

In order to produce from the rectangular pulse voltage a d.c. voltage, the control stage according to a particularly preferred embodiment includes an operational amplifier, to one input (−) of which is fed the pulse output and to the other input (+) of which is fed a comparison d.c. voltage representing the desired velocity or rated rotational speed. The formation of the d.c. voltage and the comparison therefore take place in a single control stage. By the term "operational amplifier" is normally understood, as known in the art, a d.c. voltage amplifier with large negative amplification factor and a high input resistance which is customarily operated with a negative feedback by way of a resistance.

Appropriately, the comparison voltage is derived from a potentiometer connected to a stabilized voltage source. A particularly simple construction resides in that the stabilized voltage is taken off from the Zener diode, to which is also connected the multivibrator.

A control system which notwithstanding great universality is of very simple and economic construction, consists in that the control stage is constructed as proportional regulator or controller with simultaneous differentiating, integrating and low pass effect. The operational amplifier therefore carries out simultaneously several functions in the system of the present invention.

Preferably the limit frequency of the low pass lies below the frequencies of the pick-up. Appropriately, the limit frequency lies at about 10 Hz.

According to a preferred embodiment, the differentiatingly operable part is effective within the range of the natural frequency of the control system. The integratingly operable part is advantageously effective within the range of long-period velocity or rotational speed changes so that a deviation of the intended velocity which occurs over longer time intervals becomes impossible.

A particularly appropriate embodiment provides that for achieving the low-pass effect, the pulse output is connected by way of an RC-element and a resistance amounting to 1/5 to 1/10 of the resistance of the RC-element to the minus input of the operational amplifier and the output of the operational amplifier is connected by way of a high ohmic negative feedback resistance with the point of connection of the aforementioned resistances and by way of a condenser with the minus input. Preferably, the pulse output is additionally connected by way of a condenser and a resistance to the point of connection.

According to a further embodiment of the present invention, the capacity of the condenser is larger and the value of the resistance smaller than the corresponding values of the parallelly connected RC-element.

Preferably a series circuit consisting of condenser and resistance is connected in parallel to the high-ohmic negative feedback resistance. The resistance is thereby advantageously considerably smaller than the high ohmic negative feedback resistance.

The output compensation of the operational amplifier is appropriately equipped, i.e., loaded with a condenser of small capacity.

A further embodiment is so constructed that the d.c. output voltage is chopped in the control stage into a rectangular pulse voltage with an average value equal to the d.c. output voltage and is fed to an adjusting magnet constituting the control device, which is prestressed by a spring in the closing direction. One succeeds thereby to effectively avoid a getting stuck of the adjusting magnet by reason of its static friction.

The electronic control device according to the present invention is utilized with particular advantage in a Diesel injection pump. It is thereby preferably attached at an end face of the pump. It is particularly advantageous if the control device is accommodated in a housing adapted to be secured at the pump and closed by a cover. The pulse former, the control stage and the output stage are thereby preferably arranged in the cover of the housing on a printed circuit plate. By reason of this construction, it is possible, for example, without any further difficulty to obtain a completely different control characteristic by a mere interchange of the cover.

The control system according to the present invention may also be utilized to advantage with several parallelly connected machines, where the problem exists, as is known, to distribute the load as uniformly as possible over all machines. For achieving a load-distribution which is as equal as possible, each machine is equipped with the same control device constructed in accordance with the present invention whereby the control circuits of the non-leading or non-guiding machines are separated at the connecting place of the control stage and of the output stage and the control stages are connected with the output stage of the leading or guiding machine.

Accordingly, it is an object of the present invention to provide an electronic control device for the velocity of a machine element which effectively avoids the aforementioned shortcomings and drawbacks encountered in the prior art.

Another object of the present invention resides in an electronic control device for the velocity of a machine element which completely satisifes the high requirements as regards operational accuracy and reliability without the need for costly mechanical or hydraulic arrangements.

A further object of the present invention resides is an electronic control system of the type described above which assures a high control accuracy with a relatively simple construction of low cost that is far-reachingly unaffected by interfering influences.

Still a further object of the present invention resides in a control device of the type described above which can be manufactured in a favorable manner by the use of components performing several functions.

Another object of the present invention resides in an electronic control device for the velocity of a machine element which minimizes the problems of accurate follow-up in case of slight deviations from the intended velocity due to the static friction in the adjusting device.

Still another object of the present invention resides in an electronic control system of the type described above which can be readily changed as to its control characteristics by merely interchanging a cover element containing a printed circuit plate.

Another object of the present invention resides in a control system for controlling the velocity of several parallelly connected machines which assures a highly uniform distribution of the load over all the machines connected in parallel.

These and further objects, features and advantages of the present invention will become more apparent from the following description when taken in connection with the accompanying drawing which shows, for purposes of illustration only, one embodiment in accordance with the present invention, and wherein:

FIG. 1 is a schematic block diagram of a preferred embodiment of a control device according to the present invention;

FIG. 2 is a schematic circuit diagram of a preferred embodiment of a pulse transformer used with the control device in accordance with the present invention;

FIG. 5 is a schematic view of a Diesel injection pump with an attached control device in accordance with the present invention, shown partially in cross section.

Figure 3:
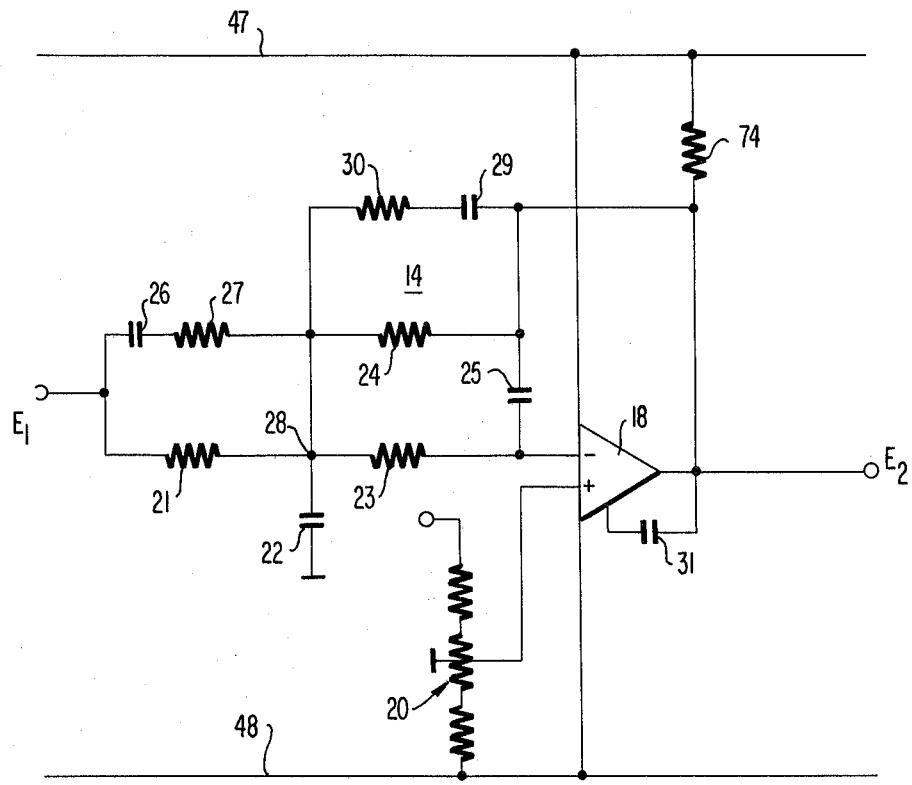
FIG. 3 is a schematic circuit diagram of a preferred embodiment of a control stage provided in the control device according to the present invention.

Referring now to the drawing wherein like reference numerals are used throughout the various views to designate like parts, and more particularly to FIG. 1, an inductive pick-up or transmitter 11 of any conventional construction is so arranged at a gear 16 to be held at an intended or desired rotational speed that the teeth passing the pick-up 11 produce a pulse voltage at the output of the pick-up whose frequency is proportional to the rotational speed. This voltage is supplied to a pulse former 13 which forms from the induced a.c. voltage rectangular pulses of equal length an equal height with a frequency proportional to the velocity.

A control stage 14 is connected to the pulse transformer 13 in which a d.c. voltage representing the desired velocity is compared with the electrical signal reproducing the actual velocity and a d.c. output voltage proportional to the deviation from the desired value is formed.

The output signal of the control stage 14 is fed to an output of final stage 15 by means of which a control element 12 constructed as adjusting magnet is controlled corresponding to the output signal of the control stage 14.

The circuit of the pulse former 13 is schematically illustrated in detail in FIG. 2. The pick-up 11 is connected by way of two suitably dimensioned resistances 49 and 50 with two lines 47 and 48 to which is applied a d.c. voltage of 12 V. The pick-up 11 is thereby premagnetized by means of a small current.

The output a.c. voltage of the pick-up 11 is applied by way of the resistances and condensers 52, 53, 54, 55 and 56 connected as shown in FIG. 2, to an operational amplifier 51 which is also supplied with d.c. voltage by way of the lines 47, 48.

The operational amplifier 51 forms a rectangular voltage of which the flanks reach a point 58 by way of a condenser 57. The waveform of the voltage reaching the point 58 is indicated in FIG. 2 above point 58.

The output of the operational amplifier 51 is additionally connected by way of a resistance 60 with the line 47 and by way of a resistance 59 with the + input of the operational amplifier 51.

The point 58 is connected by way of a diode 61 with the input of a monostable multivibrator generally designated by reference numeral 17 in such a manner that only the falling or trailing flanks of the rectangular pulses are applied to the multivibrator as negative voltage peaks.

The multivibrator 17 includes transistors 62 and 63, resistances 64, 65, 66, 67 and 68, a diode 69 and condensers 70 and 71, all connected as shown in FIG. 2.

The voltage supply of the multivibrator 17 takes place from the line 47 by way of a resistance 72 whereby a Zener diode 19 with condenser 73 connected in parallel thereto takes care for a stabilization of the voltage.

A voltage $E_1$ exists in the output of the multivibrator 17 which consists of rectangular pulses of equal length and equal height whose repetition frequency is proportional to the rotational speed of the gear 16.

The heart of the control system according to the present invention consists of the control stage illustrated in FIG. 3. The rectangular pulse voltage $E_1$ is applied by way of resistances 21 and 23 to the inverting input of a further operational amplifier 18.

The connecting point 28 between the two resistances 21 and 23 is connected to ground by way of a condenser 22, thereby forming a RC-element, comprising the resistance 21 and the condenser 22, between the pulse output of multivibrator 17 and the minus input of the operational amplifier 18.

The non-inverting input of the operational amplifier 18 is connected to a voltage divider generally designated by reference numeral 20 which is preferably also fed from the voltage stabilized by the Zener diode 19. The voltage picked up by the voltage divider 20 and fed to the non-inverting input of the operational amplifier 18 is a measure for the desired or intended value of the rotational speed to be controlled. Obviously, the pick-up in the voltage divider 20 may be realized by means of a potentiometer to permit adjustment of the desired value.

The output of the operational amplifier 18 is connected by way of a resistance 74 with the line 47 which is at the 12 V potential, and is supplied with voltage by way of the lines 47 and 48. The output of the operational amplifier 18 is equipped with a condenser 31 having a small capacity.

The output of the operational amplifier 18 is additionally connected by way of a negative feedback resistance 24 with the point 28 and by way of a condenser 25 with the inverting input of the operational amplifier 18.

According to the present invention, an integrating behavior is imparted to control stage 14 in that the output of the operational amplifier 18 is additionally connected with the point 28 by way of a condenser 29 and a resistance 30 connected in series with the condenser 29. A differentiating behavior which is appropriate for the suppression of the natural or inherent frequencies of the control circuit, is additionally brought about in that the input signal $E_1$ is also connected to the point 28 by way of a condenser 26 and a resistance 27 connected in series with the condenser 26.

By reason of the circuit in accordance with the present invention whose individual components may have values of the magnitudes as indicated by the typical values set forth at the end of this specification, a d.c. voltage $E_2$ is produced in the output of the operational amplifier 18 which is a measure for the adjusting magnitude of the control circuit and corresponds to the intended control-path or control displacement for the injection pump.

Figure 4:
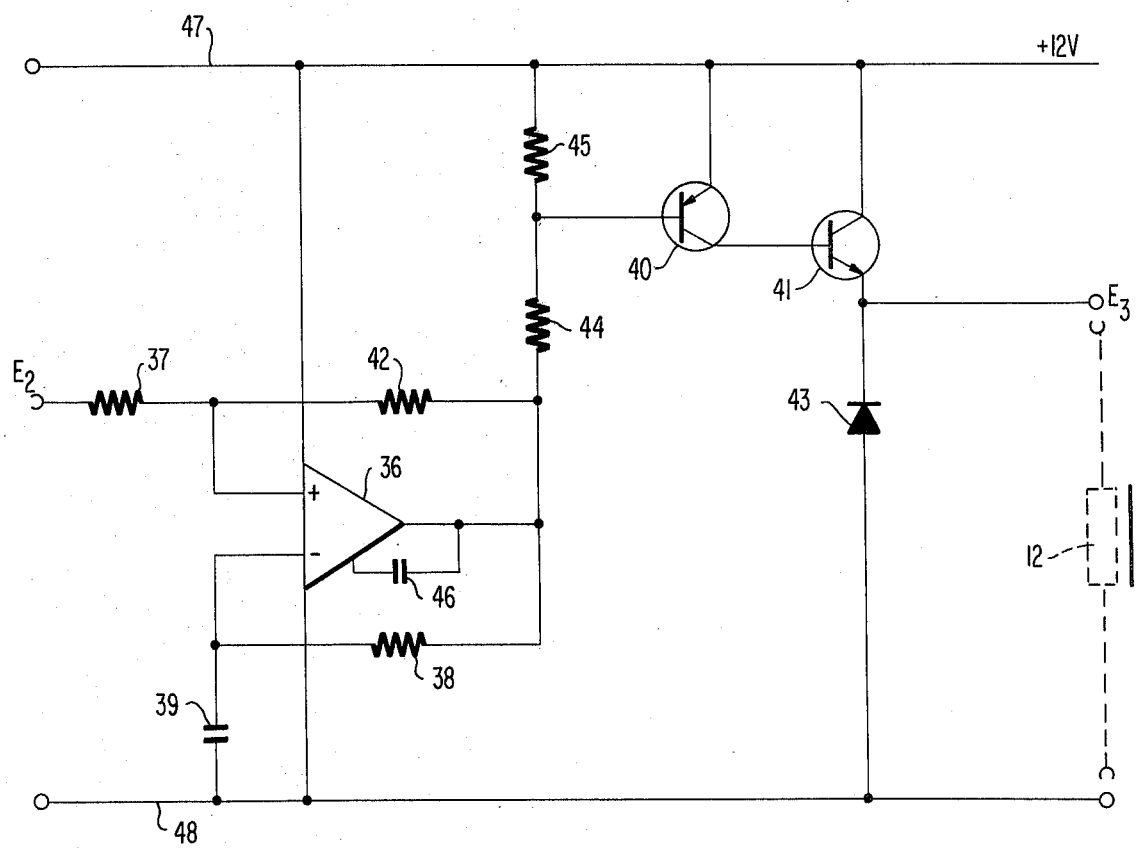
FIG. 4 is a schematic circuit diagram of a preferred embodiment of an output stage provided in the control device according to the present invention.

The d.c. voltage $E_2$ is finally fed to the output stage whose circuit is schematically illustrated in detail in FIG. 4.

According to FIG. 4, an operational amplifier 36 is connected between the lines 47 and 48 which are at a potential of 12 V. The non-inverting input (+) of the operational amplifier 36 is connected with the d.c. control voltage $E_2$ by way of a series resistance 37. The output of the operational amplifier 36 is connected, on the one hand, by a positive feedback resistance 42 which is approximately ten times as large as the series resistance 37, with the non-inverting input and, on the other, is connected by way of a resistance 38 with a condenser 39 which is connected between the line 48 an the inverting input (−).

Furthermore, the output of the operational amplifier 36 is connected with the line 47 by way of a voltage divider 44, 45.

A first transistor 40 is connected with its base to the point of connection of the resistances 44 and 45 whereas its emitter is directly connected with the line 47. The collector is connected to the base of an output or power transistor 41 which is of the opposite conductivity type as the transistor 40. The collector of the transistor 41 is connected with the line 47 whereas its emitter supplies the rectangular pulse voltage $E_3$ to an adjusting magnet 12.

A diode 43 is connected in parallel to the adjusting magnet 12 which is conductive in the opposite direction to the base emitter circuit of the transistor 41.

The output compensation of the operational amplifier 36 includes a condenser 46 of slight capacity.

The operation of the described circuit is as follows:

Upon application of d.c. control voltage $E_2$, the amplifier output at first becomes positive. Due to the positive feedback by way of the resistance 42, the voltage additionally increases at the non-inverting input (+).

The output transistor 41 is now blocked or non-conductive.

After the amplifier output becomes positive, the condenser 39 begins to charge by way of the resistance 38. As soon as the voltage at the condenser 39 reaches the value at the non-inverting input (+), the operational amplifier 36 which operates as comparator, flips over. Its output now becomes negative and the output transistor 41 becomes conductive. At the same time, the voltage at the condenser 39 again drops and the voltage at the non-inverting input (+) jumps down to a lower value by the amount of the positive feedback. The operational amplifier 36 now flips back into its starting condition only when the voltage at the condenser 39 drops below the value at the non-inverting input. Up to that point of time, the output transistor 41 remains conductive.

The condenser 46 serves for avoiding switching irregularities or uncertainties. The average voltage at the non-inverting input corresponds to the control voltage and to the average charging voltage at the condenser 39.

Consequently, the output voltage of the operational amplifier 36 assumes only two extreme values so that the keying ratio of the output voltage is fixedly coorinated to the d.c. control voltage $E_2$. Thus, the duration of energization of the adjusting magnet 12 is proportional to the d.c. control voltage $E_2$.

If the d.c. control voltage changes within a switching period by more than the width of the positive feedback hysteresis, then with a control voltage rise, an excessively long pulse will appear at the output. The pulse lasts for such length of time until the condenser voltage has reached the new hystersis band. With a rapid decrease of the control voltage, the operation is correspondingly reverse.

From an overall point of view, a rate action is produced by the described effect which improves the adjusting velocity of the adjusting magnet 12 in an advantageous manner. The output stage operates nearly loss-free.

By an appropriate selection of the pulse frequency, a slight co-vibration or sympathetic vibration of the adjusting member 12 is effected according to the present invention whereby the mechanical friction hysteresis is decisively reduced. Consequently, the pulse frequency has to be matched to the inertia of the adjusting magnet 12.

A very accurate and reliable control is achieved by the circuit in accordance with the present invention and especially by the control stage 14 illustrated in FIG. 3 which is practically not disturbed by ignition pulses of the engine and the natural or inherent resonant frequency of the control circuits. Also, slow rotational speed oscillations or hunting are prevented.

A Diesel injection pump 33 is schematically illustrated in FIG. 5, onto which is attached a housing 34 in which are accommodated the rotational speed pick-up or transmitter 11, the adjusting magnet 12 and a return spring 32 for the control rack 75 of the injection pump. The housing 34 includes at the end face thereof a cover 35 in which is accommodated on a printed circuit plate 77 the electronic part of the control device according to the present invention which essentially consists of the pulse former 13, of the control stage 14 and of the output stage 15.

On the side opposite the injection pump 33, a spring-loaded mechanical abutment 76 is provided for the limitation of the injection quantity at full load.

The present invention thus provides a controller adapted to be mounted directly at the element to be controlled, which not only operates reliably but also is of compact construction. Additionally, by actuation of the intended value pick-up 20, the rotational speed can also be adjusted and controlled within desired limits.

The following are typical values for a preferred embodiment of the individual components of a circuit arrangement in accordance with the present invention.

| | | | |
|---|---|---|---|
| Resistance 21 | = 82 K | Resistance 38 | = 270 K |
| Capacitance 22 | = 0.68 $\mu$ | Capacitance 39 | = 0.15 $\mu$ |
| Resistance 23 | = 12 K | Resistance 42 | = 180 K |
| Resistance 24 | = 4.7 M | Resistance 44 | = 2.7 K |
| Capacitance 25 | = 0.01 $\mu$ | Resistance 45 | = 1 K |
| Capacitance 26 | = 1.5 $\mu$ | Capacitance 46 | = 22 p |
| Resistance 27 | = 39 K | Resistance 49 | = 18 K |
| Capacitance 29 | = 0.22 $\mu$ | Resistance 50 | = 10 K |
| Resistance 30 | = 680 K | Capacitance 52 | = 0.1 $\mu$F |
| Capacitance 31 | = 22 p | Resistance 53 | = 2.7 K |
| Resistance 37 | = 18 K | Capacitance 54 | = 0.033 $\mu$F |
| Resistance 55 | = 3.9 K | Resistance 66 | = 4.7 K |
| Resistance 56 | = 100 K | Resistance 67 | = 22 K |
| Capacitance 57 | = 330 p | Resistance 68 | = 2.7 K |
| Resistance 59 | = 68 K | Capacitance 70 | = 0.01 $\mu$ |
| Resistance 60 | = 2.2 K | Capacitance 71 | = 1.5 n |
| Resistance 64 | = 680 | Resistance 72 | = 270 |
| Resistance 65 | = 1.2 K | Capacitance 73 | = 4.7 $\mu$ |

While I have shown and described only one embodiment in accordance with the present invention, it is understood that the same is not limited thereto but is susceptible of numerous changes and modifications as known to those skilled in the art. For example, conventional components indicated only schematically may be used of which various types are commercially available. Additionally, the typical values for the circuit parameters indicated above may be changed as known to those skilled in the art to suit particular needs. Furthermore, changes may also be made in the circuit as known to those skilled in the art. Hence, I do not wish to be limited to the details shown and described herein but intend to cover all such changes and modifications as are encompassed by the scope of the appended claims.

What I claim is:

1. An apparatus for controlling a Diesel engine at a predetermined velocity comprising an injection pump means for injecting a controlled amount of fuel into the engine and an electronic control means attached to an end face of said pump means for controlling the amount of fuel injected into the engine, said electronic control means including a transmitter means producing an a.c. voltage having a frequency proportional to the actual velocity of the engine and having an electric signal derived from the a.c. voltage which actuates a control element influencing the velocity of the machine element in the sense of a cancellation of a deviation from the predetermined velocity, said transmitter means being a premagnetized inductive pick-up means responding to the passing of the teeth of a gear of the engine, a pulse former means operatively connected to the transmitter means which forms from the a.c. voltage substantially rectangular pulses of substantially equal length and substantially equal height having a frequency proportional to the velocity, wherein rectangular pulses are formed in the pulse former means from the a.c. voltage supplied by the transmitter means and of these rectangular pulses the falling flanks are used for triggering a monostable multivibrator means which, after unblocking by the falling flank, remains unblocked during an accurately defined substantially constant time interval and then reverts to its blocked condition so that the average value of the pulse output corresponds to the velocity of the machine element as represented by the rotational speed of the gear, said operating voltage of the multivibrator means being stabilized by means of a Zener diode, the stabilized voltage source for the comparison voltage being derived from the Zener diode to which is also connected the multivibrator means, a control stage means operatively connected with the pulse former means in which a d.c. voltage representing the desired velocity is compared with the electric signal reproducing the actual velocity and a d.c. output voltage is produced proportional to the deviation from the desired value, said control stage means being operable as a proportional control element with simultaneous differentiating, integrating and low-pass effect, wherein the limit frequency of the low-pass lies below the frequenices of the transmitter means, an output stage means operatively connected with the control stage means and operable to control the control element corresponding to the output signal of the control stage means, means for achieving the low-pass effect, said means including the pulse output of the pulse former means being connected with one input of an operational amplifier means of the control stage means by way of an RC-element and by way of a resistor having a resistance value approximately equal to 1/5 to 1/10 of the resistance of the RC-element and connected in series with the resistor of the RC-element and the output of the operational amplifier means of the control stage means being connected by way of a high ohmic negative feedback means with the point of connection of the aforementioned resistors and by way of a condenser with said one input, wherein the pulse output of the pulse former means is additionally connected to said point of connection by way of a series circuit including a further condenser and a further resistor, the capacity of said further condenser being larger and the value of said further resistor being smaller than the corresponding values of the parallel-connected RC-element, a series circuit consisting of condenser and resistor means connected in parallel to the high ohmic negative feedback means, the resistance of said last-mentioned resistor means being considerably smaller than the high ohmic negative feedback means, said operational amplifier means of said control stage means being provided with an output compensation including a condenser means of small capacity, and means for chopping the d.c. output voltage of the control stage means in the output stage means into a rectangular pulse voltage with an average value substantially equal to the d.c. output voltage of the control stage means and for feeding to an adjusting magnet consituting the control element, wherein the adjusting magnet constituting the control element is prestressed in the closing direction by a spring.

2. An apparatus for controlling a Diesel engine at a predetermined velocity comprising an injection pump means for injecting an amount of fuel into the Diesel engine, and control means including a control element for regulating the amount of fuel injected into the Diesel engine, said control means comprising transmitter means for producing an alternating voltage having a frequency proportional to an actual value of engine velocity;

pulse former means operatively connected to said transmitter means for forming from the alternating voltage an output signal of equal length and equal height rectangular pulses, said rectangular pulses having a frequency proportional to the actual velocity;

control stage means operatively connected with said pulse former means for comparing said output signal of said pulse forming means with a direct voltage corresponding to the predetermined velocity and for producing an output voltage proportional to a deviation of the actual velocity from the predetermined velocity, said control stage means including an operational amplifier means for simultaneously providing differentiating, integrating and low-pass effect functions, and output stage means operatively connected to the control stage means for controlling the control element in dependence on the output voltage of said control stage means, so that the control element regulates the amount of fuel injected into the Diesel engine by said injection pump means to reduce said deviation of the actual velocity from the predetermined velocity.

3. A control apparatus according to claim 2, wherein said control means is attached to an end face of the pump means.

4. A control apparatus according to claim 2, wherein said control means is accommodated in a housing adapted to be secured at the pump means and closed by a cover means.

5. A control apparatus according to claim 4, wherein the pulse former means, the control stage means and the output stage means are arranged in the cover means of the housing on a printed circuit plate.

6. A control apparatus according to claim 2, wherein said transmitter means includes a premagnetized inductive pick-up means responding to the passing of the teeth of a gear representing the engine velocity.

7. A control apparatus according to claim 2, wherein said output signal of rectangular pulses trigger a monostable multivibrator means by falling flanks of said rectangular pulses, said multivibrator means being unblocked by the falling flanks and remain unblocked during an accurately defined substantially constant time interval, the multivibrator means thereafter reverts to the blocked condition so that the average value of the pulse output corresponds to the velocity of the engine.

8. A control apparatus according to claim 7, wherein at the predetermined velocity the pulse/pulse-gap ratio is substantially 1:1.

9. A control apparatus according to claim 8, wherein a Zener diode stabilizes the operating voltage of the multivibrator means.

10. A control apparatus according to claim 2 wherein said operational amplifier means includes one input to which is supplied the pulse output of the pulse former means and another input to which is applied the direct voltage representing the predetermined velocity.

11. A control apparatus according to claim 10, wherein said direct voltage is picked up from a potentiometer connected to a stabilized voltage source.

12. A control apparatus according to claim 11, wherein the stabilized voltage source for the direct voltage is derived from a Zener diode.

13. A control apparatus according to claim 10, wherein said operational amplifier means comprises a proportional control element including simultaneous differentiating, integrating and low-pass effect means.

14. A control apparatus according to claim 13, wherein the low-pass effect means has limit frequency below the frequencies of the transmitter means.

15. A control apparatus according to claim 14, wherein the limit frequency is approximately at 10 Hz.

16. A control apparatus according to claim 13, wherein the differentiating means is effective within the range of the natural frequency of the control apparatus.

17. A control apparatus according to claim 13, wherein the integrating means is operable within the range of long-period velocity changes.

18. A control apparatus according to claim 13, wherein the low-pass effect means includes the pulse output of the pulse former means being connected with one input of the operational amplifier means of the control stage means by way of an RC-element and by way of a resistor having a resistance value approximately equal to 1/5 to 1/10 of the resistance of the RC-element and connected in series with the resistor of the RC-element, and wherein the output of the operational amplifier means of the control stage means is connected by way of a high ohmic negative feedback means with the point of connection of the aforementioned resistors and by way of a condenser with said one input, thereby providing said simultaneous low-pass effect.

19. A control apparatus according to claim 18, wherein the pulse output of the pulse former means is additionally connected to said point of connection by way of a series circuit including a further condenser and a further resistor, thereby providing said simultaneous differentiating function.

20. A control apparatus according to claim 19, wherein the capacity of said further condenser is larger and the value of said further resistor is smaller than the corresponding values of the parallel-connected RC-element.

21. A control apparatus according to claim 18, wherein a series circuit consisting of condenser and resistor means is connected in parallel to the high ohmic negative feedback means, thereby providing said simultaneous integrating function.

22. A control apparatus according to claim 21, wherein the resistance of said last-mentioned resistor means is considerably smaller than the high ohmic negative feedback means.

23. A control apparatus according to claim 22, wherein the operational amplifier means of said control stage means is provided with an output compensation including a condenser means of small capacity.

24. A control apparatus according to claim 23, wherein means are provided for chopping the d.c. output voltage of the control stage means in the output stage means into a rectangular pulse voltage with an average value substantially equal to the d.c. output voltage of the control stage means and for feeding said chopped voltage to an adjusting magnet constituting the control element.

25. A control apparatus according to claim 24, wherein the adjusting magnet constituting the control element is prestressed in the closing direction by a spring.

26. A control apparatus according to claim 2, for use with several engines connected in parallel comprising a leading engine and a plurality of non-leading engines, wherein each engine includes similar control means, and wherein the control means of the leading engine is connected with the control means of the non-leading engines for equalizing load-distribution between all engines.

27. A control apparatus according to claim 1, characterized in that the control device is attached to an end face of the pump means.

28. A control apparatus according to claim 27, characterized in that the control device is accommodated in a housing adapted to be secured at the pump means and closed by a cover means.

29. A control apparatus according to claim 28, characterized in that the pulse former means, the control stage means and the output stage means are arranged in the cover means of the housing on a printed circuit plate.

* * * * *